US005452506A

United States Patent [19]

Biedermann et al.

[11] Patent Number: 5,452,506

[45] Date of Patent: Sep. 26, 1995

[54] PROCESS FOR REMOVING CONTAINER SEALS

[75] Inventors: Udo Biedermann, Cologne; Erich Steingroever, Bonn, both of Germany

[73] Assignee: Magnet-Physik Dr. Steingroever GmbH, Germany

[21] Appl. No.: 144,016

[22] Filed: Nov. 1, 1993

[30] Foreign Application Priority Data

Nov. 5, 1992 [DE] Germany .......................... 42 37 329.8
Mar. 10, 1993 [DE] Germany .......................... 43 07 708.0

[51] Int. Cl.$^{6}$ ............................ B23P 19/02; B21D 26/14; B67B 7/16

[52] U.S. Cl. ....................... 29/426.4; 29/419.2; 53/381.4; 72/56

[58] Field of Search ............................... 29/419.2, 426.4, 29/426.6, 801, DIG. 95, DIG. 96; 72/54, 56; 53/381.4, 329.2, 412, 492; 269/8; 335/291

[56] References Cited

U.S. PATENT DOCUMENTS

| | | | |
|---|---|---|---|
| 3,214,832 | 11/1965 | Schwinghamer | 29/419.2 X |
| 3,426,564 | 2/1969 | Jansen et al. | 72/56 |
| 3,526,076 | 9/1970 | Siewerth et al. | 72/56 X |
| 3,581,456 | 6/1971 | Gere | 72/56 X |
| 3,635,513 | 1/1972 | Ewards | 269/8 X |
| 3,706,176 | 12/1972 | Leatherman | 53/329.2 X |
| 3,808,074 | 4/1974 | Smith et al. | 156/69 |
| 3,842,574 | 10/1974 | Dickey | 53/42 |
| 4,129,846 | 12/1978 | Yablochikov | 336/84 |

FOREIGN PATENT DOCUMENTS

| | | | |
|---|---|---|---|
| 3422208 | 8/1990 | Germany . | |
| 105788 | 5/1987 | Japan | 53/381.4 |
| 896923 | 10/1962 | United Kingdom | 29/419.2 |
| 1165116 | 9/1969 | United Kingdom . | |
| 2133781 | 8/1984 | United Kingdom | 53/381.4 |

OTHER PUBLICATIONS

Report of German Patent Office dated 24 Aug. 1993.

*Primary Examiner*—Peter Vo
*Attorney, Agent, or Firm*—Harold Gell

[57] ABSTRACT

This is a description of a process and equipment for the removal of seals (closures or caps) for containers, that works with an electromagnetic pulse. The pulse is generated in a current pulse coil, that grasps around the seal, by the discharge current of a condenser. The process and the equipment are suited for removing seals (closures or caps) from containers for milk and dairy products and also for other beverages and products.

17 Claims, 4 Drawing Sheets

FIG. 1
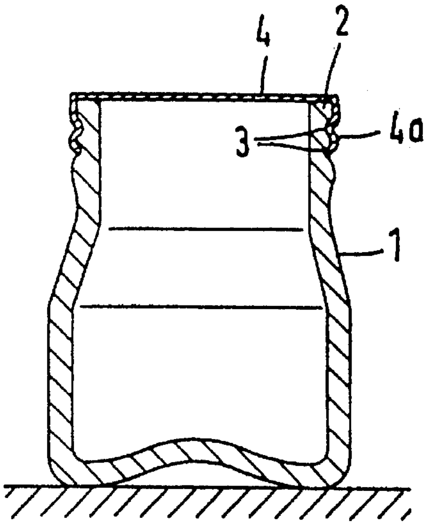
FIG. 2
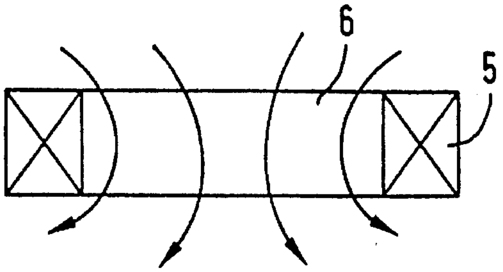
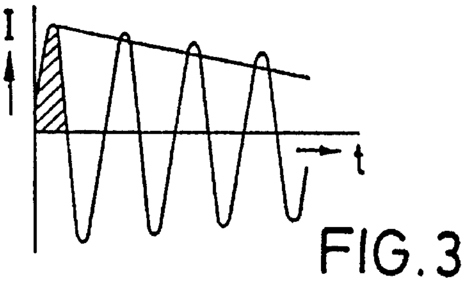
FIG. 3
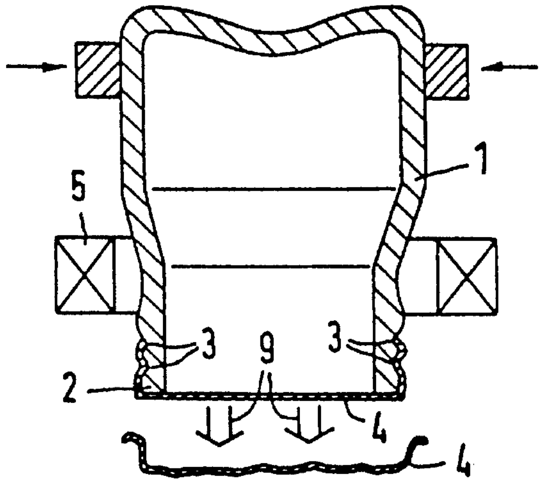
FIG. 4

PROCESS FOR REMOVING CONTAINER SEALS

TECHNICAL FIELD

This invention relates to a process for removing container seals (closures or caps) consisting of a magnetic field responsive material such as an electrically-conducting metal, especially aluminum or a light-metal alloy, and it further relates to equipment for the implementation of the process.

BACKGROUND OF THE INVENTION

It is known that containers can be sealed with metal caps that are folded or crimped upon and around the container opening.

There is a problem connected with the removal of such seals (closures or caps), especially seals for milk, cocoa or juice bottles, that consist of a thin metal foil, and that are penetrated by a drinking straw.

For recycling purposes, the seal parts, that are still present on empty bottles, must be removed completely before the bottles are reused. For this purpose, the bottles, for example, are run through rotating brushes that scratch the seal remnants off the bottle opening; in this procedure, seal materials, such as aluminum or a light-metal alloy, or a glass, are partly pulverized from the container and metal dust or glass splinters are released; this causes considerable contamination of the filling systems. Besides, the bottle necks are scratched and damaged by the rotating brushes so that it is more difficult to put a tight new seal on the bottles, as a result of which the reusability cycle of those bottles is cut short. Besides, bottles with scratches incline toward rupture.

OBJECTIVES OF THE INVENTION

The problem in the invention is to provide a process and equipment suitable for the implementation of the process, by means of which it will be possible in a technically perfect manner to remove the seals (closures or caps) from containers, such as, especially, milk bottles and other containers, without damaging the containers.

A primary objective of the objection is to provide a process for removing container seals (closures or caps) of electrically conductive material by deforming them, characterized by an electromagnetic pulse that acts on the seal.

Another objective of the invention is to provide a process for removing container seals (closures or caps) of metal by deforming them, characterized in that an electromagnetic pulse acts on the rim of the seal.

Another objective of the invention is to provide a process for removing container seals (closures or caps) of metal by deforming them, characterized in that an electromagnetic pulse is generated with a current coil by way of the discharge current of a capacitor.

Another objective of the invention is to provide a process for removing container seals (closures or caps) of metal characterized in that the discharge of the capacitor takes place aperiodically, periodically, or as the first sine half-wave of the capacitor discharge.

Another objective of the invention is to provide a process for removing container seals (closures or caps) of metal characterized in that it consists of a pulse coil and a pulse generator.

Another objective of the invention is to provide a process for removing container seals (closures or caps) by deforming them via an electromagnetic pulse produced by a coil that tightly surrounds the rim of the closure.

Another objective of the invention is to provide a process for removing container seals (closures or caps) characterized in that the pulse coil is connected via a pulse transformer to the pulse generator.

Another objective of the invention is to provide a process for removing container seals (closures or caps) characterized in that a back stop or brace for the top of the closure is connected to the pulse coil assembly.

Another objective of the invention is to provide a process for removing container seals (closures or caps) characterized in that the closure to be removed is located in the homogeneous part of the coil field.

Another objective of the invention is to provide a process for deforming container seals (closures or caps) characterized in that it is applied to open or remove seals closures.

Another objective of the invention is to provide a process for deforming container seals (closures or caps) of metal characterized in that the seal to be removed is located in the inhomogeneous part of the coil field.

Another objective of the invention is to provide a process for deforming container seals (closures or caps) of metal characterized for removing seals from milk, milk product or juice containers.

Another objective of the invention is to provide a process for removing container seals (closures or caps) characterized by a conical tapering starting from the opening.

SUMMARY OF THE INVENTION

The problems set forth in "BACKGROUND OF THE INVENTION" are solved according to the invention by an electromagnetic pulse that acts on the seal.

It is particularly advantageous for the removal of the seal if the electromagnetic pulse acts on the edge of the preferably thin-wall seal. The electromagnetic pulse is generated by means of a current coil due to the discharge current of a condenser. The condenser can be discharged aperiodically, periodically, or as the first sine half-wave of the capacitor discharge.

The process according to the invention can be used particularly advantageously to open or remove container seals (closures or caps) on milk bottles, cocoa or beverage bottles. The seal to be removed here lies in the non-homogenous part of the magnetic field of a current coil.

Equipment to perform the process according to the invention is characterized in that it consists of a current pulse coil and a pulse generator.

BRIEF DESCRIPTION OF THE DRAWINGS

FIG. 1 the current pulse coil encloses the edge of the seal to be removed;

FIG. 2 shows a lateral cross-section through a pulse coil with the course of the magnetic field lines indicated by arrows;

FIG. 3 illustrates the electromagnetic pulse in the form of a current-time diagram;

FIG. 4 shows an arrangement of a pulse coil for loosening or removing the seal from the opening of a container or a beverage bottle, with the opening down;

DETAILED DESCRIPTION OF THE INVENTION

Figure 5:
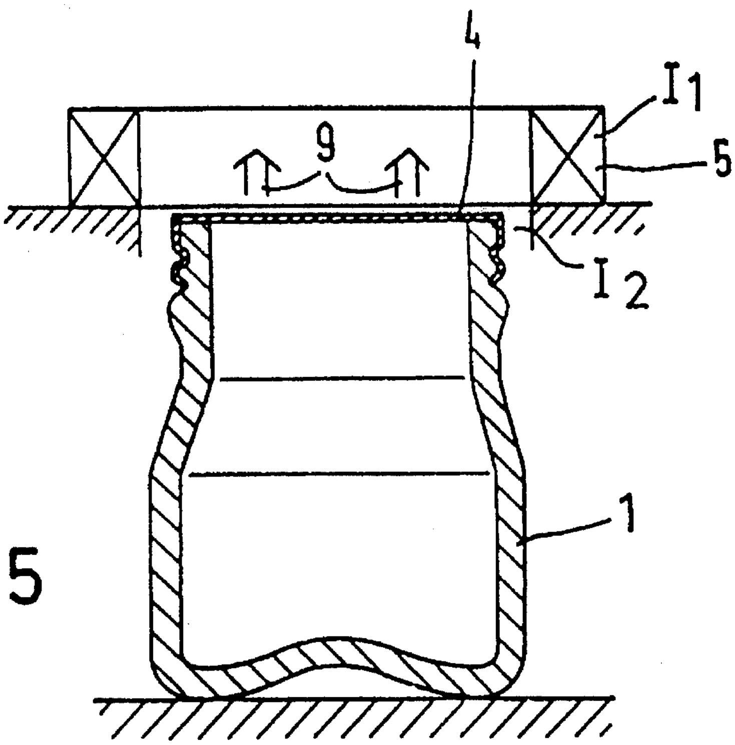
FIG. 5 shows an arrangement of a current pulse coil for loosening and removing a seal from the opening of an upright container.
Figure 6:
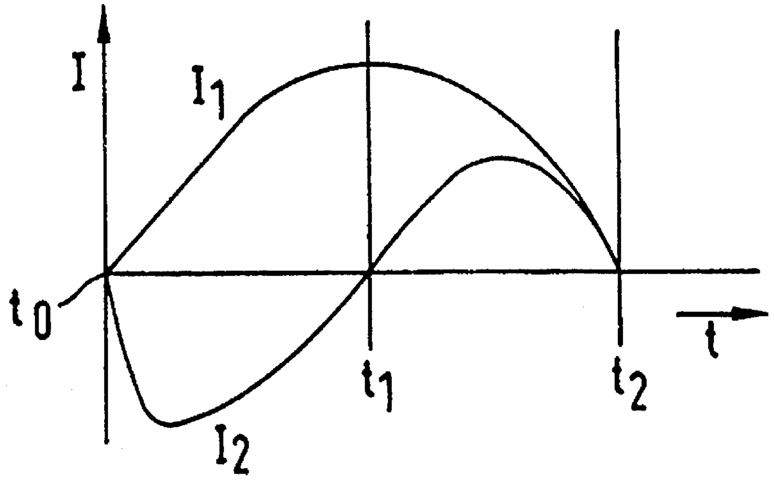
FIG. 6 shows the pertinent current-time diagram for loosening and removing the seal from the upright container in FIG. 5.

FIG. 1 shows a tightly closing seal 4 that is shaped upon the container edge or container neck 2 of a beverage bottle or a container 1, before a high electromagnetic pulse, generated by a current pulse coil 5, has acted on seal 4. Container neck 2 has one or several grooves for edge 4*a* of seal 4.

FIG. 2 is the current pulse coil 5 which has a passage opening 6 that corresponds to the shape of container neck 2. It can be made round or rectangular or polygonal.

The electromagnetic pulse can be given aperiodically or periodically or also as sine wave, as shown in FIG. 3.

The electromagnetic pulse is generated by the rapid discharge of an electric condenser. The pulse induces a high current in seal 4 and that high current seeks to bypass the magnetic field of the pulse. In the process, the arrangement of the seal determines the acceleration direction, as illustrated in FIG. 4 or 5.

The process according to the invention is particularly suitable for removing seals (closures or caps) 4 or remnants thereof from empty containers or bottles 1. For this purpose, the current pulse coil 5 is so arranged that the axial force of the electromagnetic pulse upon seal 4 will prevail. This can be achieved, for example, by arranging seal 4 in the non-homogeneous part of the magnetic field of current pulse foil 5, in other words, outside the center of the coil in the axial direction.

Such an arrangement of current pulse coil 5 and container 1 is illustrated in FIG. 4. The half-open or penetrated seal 4 of an empty bottle or container 1 is arranged in the non-homogeneous field of current pulse coil 5 and is brushed off by the current pulse in the direction of arrows 9.

The process and the equipment for the performance of the process according to the invention are particularly suited for the removal of lids or seals (closures or caps) made of light metal, aluminum, or other electrically conductive materials on empty containers for milk, dairy and beverage products.

FIGS. 5 to 10 show the removal of seals (closures or caps) 4 from standing containers 1 or milk bottles 10 and the like.

If container 1 or milk bottle 10, with the seal 4 to be removed, stands upright, then, in case of an aperiodic pulse, the current pulse coil 5 must be arranged under seal 4, something that is not always possible because of the shape of the container or bottle.

However, in case of a sine pulse (first half-wave), current pulse coil 5 can rather surprisingly lie above seal 4 and this seal 4 is nevertheless ejected upward by coil 5 (arrows 9 in FIG. 5). This effect results from a phase shift between primary current I1 of current pulse coil 5 and secondary current I2 that is thus induced in seal 4, as illustrated in the current-time diagram in FIG. 6.

From t0 to t1, both currents I1 and I2 have opposite directions and repel each other but seal 4 cannot sidestep or avoid. However, between t1 and t2, both currents I1 and I2 have the same directions and attract each other so that seal 4 will be flung upward in the direction of arrows 9 in FIG. 5.

It is a good idea to have the upper edge of seal 4 lie at the level of the lower edge of pulse coil 5. Several containers 1 or milk bottles 10 or the like, located in a row on a conveyor belt 11 or in a transport crate 16 (FIGS. 7 to 10) can thus be relieved of their seals (closures or caps) simultaneously by means of a multiple coil system 19 (FIG. 8), where the coil system is lowered down upon them or where they are lifted up into it (FIGS. 7 and 8).

Figure 7:
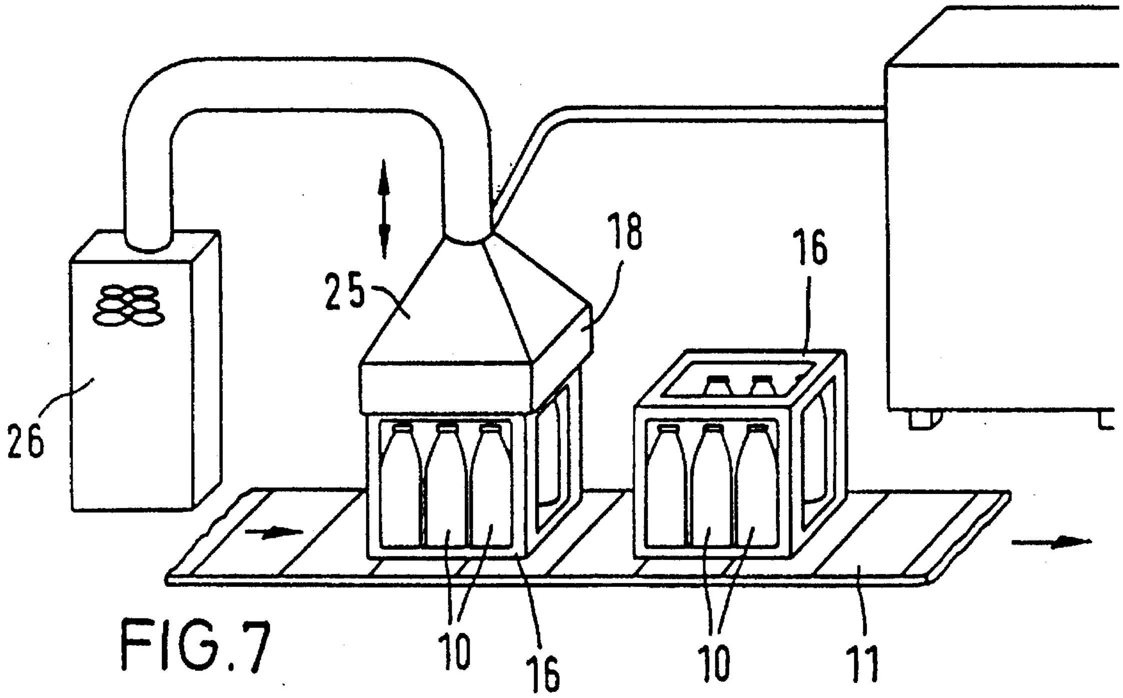
FIG. 7 shows another pictorial illustration of a device for removing the seals (closures or caps) from empty milk bottles, arriving in transport crates, standing next to each other, in a milk-filling system.
Figure 8:
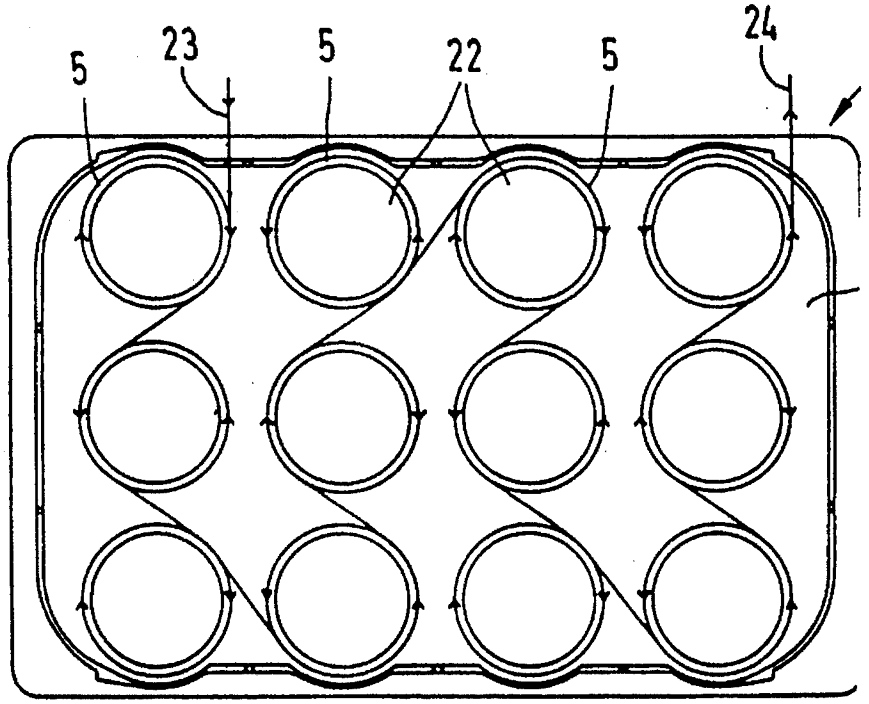
FIG. 8 is a top view on a part of this mechanism for the simultaneous removal of seals (closures or caps) from several empty milk bottles or the like, standing next to each other in a transport crate.

FIGS. 7 and 8 show a device 18 with such a multiple coil system 19 for removing container seals (closures or caps) 4. Multiple coil system 19 in shaping mechanism 18 is connected, via a pulse transformer, not shown, or directly to a pulse generator 20, whereby—on a coil carrier 21, with several openings 22, arranged next to each other—current pulse coils 5 in each case are wound in opposite directions and are connected in series, one behind the other, via common connection lines 23 and 24 with pulse generator 20.

Figure 9:
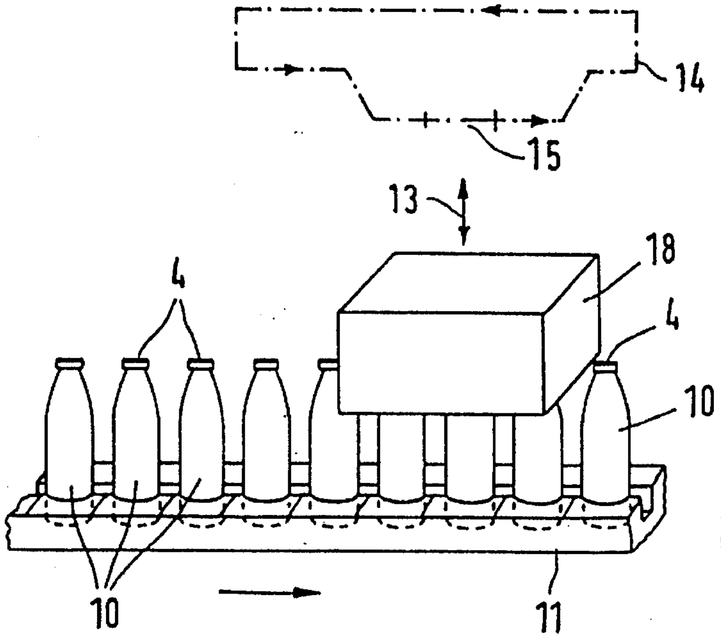
FIG. 9 is a pictorial illustration of the essential parts of a mechanism for the simultaneous removal of seals (closures or caps) from several milk or beverage bottles that are moved, one behind the other, on a transport device.

Above shaping mechanism 18 is a take-off hood 25 with a suction blower 26 to remove the seals (closures or caps) 4 that have been taken off the container or bottle necks. Two additional such mechanisms are shown in FIGS. 9 and 10; in FIG. 9, milk bottles 10 arrive standing up, one behind the other, on a conveyor belt 11, and run through a mechanism 18 for removing seals (closures or caps) 4.

Mechanism 18 can be moved up and down in the direction of double arrow 13 and has several current pulse coils 5 arranged in a row one behind the other. After lowering on container of bottle necks 2, it is moved along with conveyor belt 11 in order—after removal of seals (closures or caps) 4—following motion diagram 14, again to be returned into the next starting position. Seals (closures or caps) 4 here are always removed in area 15 of this motion diagram.

Figure 10:
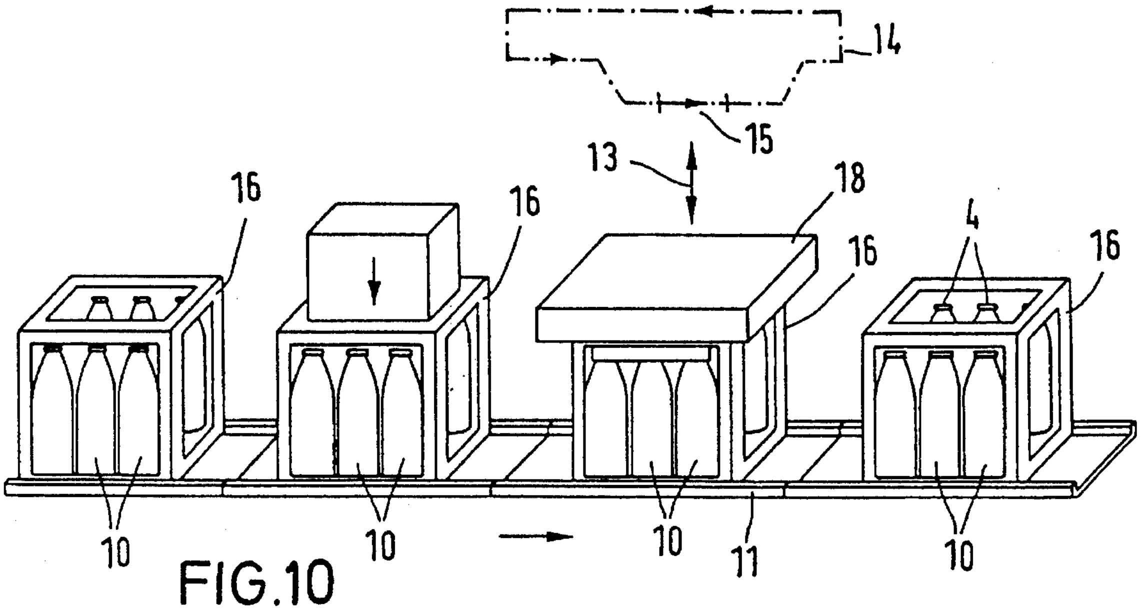
FIG. 10 is a pictorial illustration of yet another, further developed transport device with a device, arranged over it, for the simultaneous removal of the seals (closures or caps) from several milk bottles or the like standing next to each other in transport crates.

This also applies to the illustration in FIG. 10, where several milk bottles 10, standing next to each other in transport crates 16, wind up under mechanism 18 for the removal of seals (closures or caps) 4.

While preferred embodiments of this invention have been illustrated and described, variations and modifications may be apparent to those skilled in the art. Therefore, we do not wish to be limited thereto and ask that the scope and breadth of this invention be determined from the claims which follow rather than the above description.

We claim:

1. A process for removing a container sealing cap made of an electrically conductive material secured on a container, including the steps of:

generating an electromagnetic pulse that acts on said sealing cap, thereby deforming said sealing cap to disengage said sealing cap from said container; and removing said sealing cap from said container by way of said electromagnetic pulse.

2. A process as defined by claim 1, wherein said electromagnetic pulse acts on the edge of said sealing cap.

3. A process as defined by claim 1, including the step of generating said electromagnetic pulse by a process including the step of discharging a condenser through a current pulse coil.

4. A process as defined by claim 3, wherein the discharge current of said condenser which drives said current pulse coil is created by a method selected from the group of discharging techniques including:

discharging said condenser aperiodically;

discharging said condenser periodically; and discharging said condenser according to a time/discharge function equivalent to a first sine half-wave.

5. A process as defined by claim 3, wherein said sealing cap is arranged in a non-homogenous part of a magnetic field created by said current pulse coil.

6. A process as defined by claim 1, wherein said container seal is a metal foil closure.

7. A process for removing a sealing means from a container which includes a neck forming a container opening sealed by said sealing means wherein said sealing means is made of an electrically conducting metal, including the steps of;

generating an electromagnetic pulse that acts on said sealing means deforming said sealing means by way of an electromotive force created by said electromagnetic pulse;

disengaging said sealing means from said neck of said container by way of said electromotive force; and removing said sealing means from said container.

8. A process as defined by claim 7, wherein said electromagnetic pulse acts on an edge of said sealing means.

9. A process as defined by claim 7, including the step of generating said electromagnetic pulse by a process including the step of discharging a condenser through a current pulse coil.

10. A process as defined by claim 9, wherein said condenser discharge occurs aperiodically.

11. A process as defined by claim 9, wherein said condenser discharge occurs periodically.

12. A process as defined by claim 9, wherein said condenser discharge occurs as the first sine half-wave.

13. A process as defined by claim 9, wherein said sealing means is arranged in a non-homogenous part of a magnetic field created by said current pulse coil.

14. A process as defined by claim 7, wherein said sealing means to be removed is placed in the lower, non-homogenous part of a magnetic field created by a current pulse coil and is flung out and up by said magnetic field when said current pulse coil is driven with a sine half-wave pulse.

15. A process as defined by claim 7, wherein said sealing means comprises seals selected from a group of seals which includes lids for containers for milk, dairy and beverage products.

16. A process as defined by claim 7, wherein said container seal is a metal foil closure.

17. A process as defined by claim 7, wherein said container seal is a cap.

* * * * *

UNITED STATES PATENT AND TRADEMARK OFFICE

CERTIFICATE OF CORRECTION

PATENT NO. : 5,452,506

DATED : Sept. 26, 1995

INVENTOR(S) : Udo Biedermann, et al

It is certified that error appears in the above-identified patent and that said Letters Patent is hereby corrected as shown below:

On title page, item [19], should read --Steingroever, et al--
item [75], should read --Erich, Steingroever, Bonn, and
Udo Biedermann, Cologne--

Signed and Sealed this

Second Day of January, 1996

*Attest:*

BRUCE LEHMAN

*Attesting Officer* *Commissioner of Patents and Trademarks*